Aug. 22, 1933.                J. L. FINCK                 1,923,195
                       HEAT INSULATING STRUCTURE
                         Filed Nov. 9, 1928

J. Louis Finck
INVENTOR

BY
ATTORNEY

Patented Aug. 22, 1933

1,923,195

UNITED STATES PATENT OFFICE 1,923,195

HEAT INSULATING STRUCTURE

Joseph L. Finck, Washington, D. C.

Application November 9, 1928. Serial No. 318,244

9 Claims. (Cl. 20—4)

In the heat insulation of structures, such as household refrigerators, ice houses, railroad refrigerator cars, buildings, ships, etc., several factors have to be considered. First, the initial cost of the insulating material is at the present time a very important item in the total cost. Second, the thermal efficiency is an item affecting the operating cost. Third, the permanence of the insulation is important in overhead cost.

This invention presents a construction whereby material of high insulating value, but of exceedingly low cost, is made to serve as insulation for structures such as those enumerated above, and succeeds in making a considerable advance in the art of heat insulation as judged on the basis of the three factors stated above. The invention also is an improvement over my former invention disclosed in my co-pending application filed December 27, 1927, Serial #242,776, which shall be referred to more particularly hereafter.

For the heat insulating medium, I make use of loose, fibrous materials, such as kapok, cotton, jute, wood shavings, shredded paper, etc. All materials which are either natural fibers, or artificially formed fibers or shredded materials are suitable for this purpose. As a rule, such materials when loosely packed into a space, will be of a much lower bulk density than solid, board insulation, as for example, cork, wood, insulation board made of bagasse fibers, etc. Further, volume for volume, loose materials as a class are from twenty (20) to thirty (30) percent better as heat insulators than board or stiff materials. Therefore, in the use of loose materials there is a three-fold advantage: (1) an advantage in thermal efficiency; (2) a reduction in initial cost where the materials are bought by weight; (3) a considerable reduction in the weight of the total structure, thus permitting a lighter and consequently cheaper frame-work. I have found that grades of a material that are ordinarily considered of an inferior quality, or as a waste, are equally good for heat insulating purposes as the best quality material. In this invention I can therefore make use of waste products, such as waste cotton, waste flax, waste jute, waste silk or noils, etc., and reduce the cost still further.

My invention is concerned with a structure which (1) contains loose, fibrous materials; (2) functions as a heat insulator; (3) prevents any possible settling of the loose material when the structure is subjected to jarring, thus avoiding the possibility of having large air spaces which are comparatively poor insulators; (4) and, lastly, preserve the loose, insulating material in a dry condition even when the structure is exposed to an atmosphere of extreme humidity.

In carrying forward the invention the essentials thereof necesssarily are susceptible of embodiments in various forms of construction, examples of which are shown in the accompanying drawing, in which:—

Figure 1:
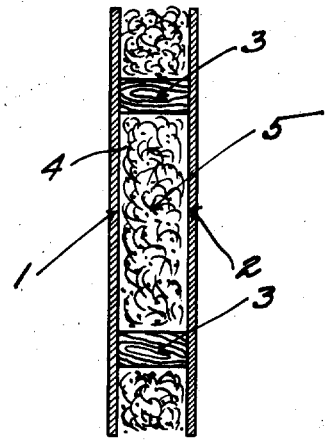
Figure 1 is a cross-sectional view of a panel form of insulation unit with the edge portions thereof open.
Figure 2:
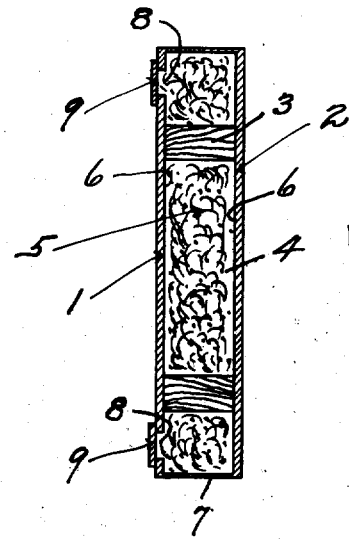
Figure 2 is a cross-sectional view of a panel form of insulation unit with the edge portions inclosed to seal the insulation space.

Referring to the illustration of Figs. 1 and 2 of the drawing the panel form of insulation unit there illustrated primarily consists of the rigid walls 1 and 2 held in spaced apart relation by any suitable means, such for instance as by the wooden or equivalent blocks or spaces 3, and provided therebetween with an insulation space 4 which is adapted to be completely and entirely filled with loose fibrous heat insulating material designated generally by the reference numeral 5.

A particular feature of the present invention is concerned with means specially provided to prevent the loose insulating material 5 within the space 4 from settling or compacting when the structure is set in a vertical position or subjected to jarring such as incidental to railroad and truck transportation. To accomplish this desirable result I provide the interior boundaries or surfaces 6 of the insulation space 4 with an adhesive coating, and to facilitate this application the adhesive would naturally be in solution, as for example, a solution of shellac, glue or rosin. Also, before introducing the loose insulating material 5 the interior wall surfaces 6 coated with adhesive should be thoroughly dried. Then it is preferable to intimately mix with the loose insulating material a small quantity of dry pulverized adhesive, as for example, shellac or rosin and introduce this mixture into the insulation space of the structure. After thus introducing into the said space the insulating material with its admixture of dry adhesive material the entire structure containing the insulating material is heated sufficiently until the adhesive on the inner wall surfaces, as well as the powdered adhesive within the body of loose material, soften and become tacky and sticky, whereupon the structure is permitted to cool. This method of procedure results in causing the loose material next to the inner wall surfaces to become firmly held or glued to the wall surfaces and the body of loose material will be bonded throughout by the adhesive so that such body of insulating material will in effect become a self-sustaining mass, resistant to any tendency to compact or pack down when the structure is subjected to jarring or when set up in vertical position for use.

The same features of the invention are embodied in the panel form insulation unit shown in both Figs. 1 and 2 of the drawing, the only difference between the two examples shown being that in the structure shown in Fig. 2 the rim part of the structure is hermetically sealed by a closure rim 7 which is soldered or otherwise permanently united by air-tight joints with the wall portions 1 and 2 of the structure. Also, in the illustrated form of the invention shown in Fig. 2 of the drawing one of the walls 1 is illustrated as being provided with filling openings 8 through which the loose insulating material may be readily introduced into the insulation space 4 and afterwards closed by the cover plates 9 which hermetically fasten in position over the said openings 8. In introducing the loose insulating material into the insulation space 4 through the openings 8 there is preferably employed the air pressure process of filling disclosed in my pending application aforesaid. As there disclosed the air pressure, in a process of this kind, is utilized as a means to pack the material into the insulation space at a proper density and it may here be noted that in the process of preparing the insulating material and introducing it into the insulation space the mixing of the pulverized adhesive with the loose material may be done outside of the structure or may be accomplished simultaneously during the process of filling by means of air pressure.

Panels such as those indicated in Figs. 1 and 2 may be used in the heat insulation of buildings. The building may be formed of a light frame-work of steel, wood or concrete, and these panels inserted to form the walls. If the building is to serve as a dwelling or office building, no difficulties may arise with moisture condensing within the loose material. However, if this building is to serve as an ice house, or for cold storage, or as a refrigerator, precautions must be taken to prevent moisture from entering space 4. I have indicated how this may be accomplished in my previous application mentioned above; viz, by forming elements 1, 2, 8 and 9 of material, such as sheet metal, which is absolutely impervious to water vapor, and soldering or welding all joints and seams so as to have space 4 hermetically sealed under approximately atmospheric pressure. The bounding edge or rim 8 should be made of very thin metal, and possibly corrugated, as indicated in my previous application, so as to reduce the heat transfer between the walls 1 and 2.

Figure 3:
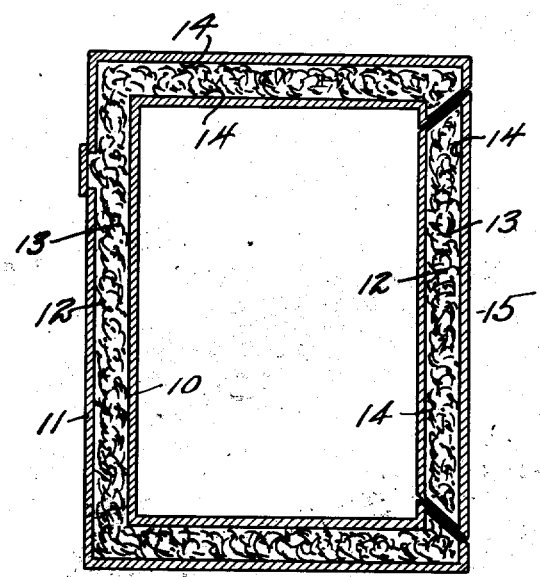
Figure 3 is a cross-sectional view of a completed structure, such as a refrigerator, embodying the heat insulation feature of the present invention.

Another embodiment of my present invention consists in the use of the above method of introducing and fixing loose, fibrous materials within an insulation space of a complete structure, such as a refrigerator, formed by inner and outer spaced apart walls as considered in my former application. This is shown in Fig. 3 of the drawing in which the inside shell of the refrigerator or equivalent container is designated by the reference numeral 10, and the outer shell by the numeral 11. This structure also would include the insulation space 12 between the walls of the inner and outer shells within which is placed the loose insulating material 13 adapted to be treated and handled in the same manner as hereinbefore described in connection with the panel form of insulated unit shown in Figs. 1 and 2 of the drawing. That is to say, the inner wall surfaces 14 of the inner and outer shells 10 and 11 of the container would be provided with the adhesive coating and the insulation material 13 would have incorporated therewith the pulverized or granular dry adhesive material. Also, after the introduction of the insulating material into the insulation space 13, the entire structure would be heated to soften the adhesive of the inner wall surfaces and within the body of insulating material and thereafter permit it to cool so that the adhesive would harden and set and thereby cause the insulating material to become adhered to the inner wall surfaces and also to set into a self-sustainig mass that will not settle or compact due to jarring or due to the structure being placed in a vertical position for use. The door member 15 of the structure shown in Fig. 3 of the drawing may be prepared and filled in the same manner.

A railroad refrigerator car may be built either with panels, such as those indicated in Figs. 1 and 2, or as a complete structure where the entire insulation space of the car is inter-connecting, similar to that shown in Fig. 3. If panels are used, the frame-work may be made of light steel, and the insulating panels supported by the frame-work.

Panels for heat insulating purposes such as described need not necessarily be of plain surfaces, but may be of whatever convenient form is desired, that is, as cylindrical, spherical, conical, etc., and such forms are intended to fall within the scope of this invention.

I claim:—

1. A heat insulating structure including spaced apart walls forming an intervening insulation space and provided upon their inner surfaces with an adhesive coating, and loose insulating material filling the insulation space and containing throughout the body thereof a granulated adhesive, said adhesive coatings and said granulated adhesive having become effective upon heating the structure to impart the desired tackiness to the adhesive and cooling thereof.

2. A method of fabricating thermally insulated constructions, which consists in assembling walls in spaced relation to provide an intervening insulation space open to the atmosphere, introducing a dry loose insulating material and also a dry, granulated adhesive into and throughout the said space, heating the complete construction until the adhesive softens, and then allowing to cool, and finally hermetically sealing said space.

3. A method of fabricating thermally insulated constructions, which consists first in assembling walls in spaced relation to provide an intervening insulation space open to the atmosphere, coating the interior of the walls with an adhesive, introducing by air pressure a dry, loose, insulating material and also a dry, granulated adhesive into and throughout the said space, heating the complete container until the adhesive softens and then allowing to cool, and finally hermetically sealing the said space under approximately atmospheric pressure.

4. A method of fabricating thermally insulated constructions, which consists in assembling walls in spaced relation to provide an intervening insulation space, coating the inner surfaces of said walls with an adhesive and permitting the coating to dry, introducing a dry loose insulating material and also a dry adhesive into and throughout the said spaces, heating the complete construction until the coatings and adhesive soften, and then allowing the structure to cool to permit the coatings and adhesive to harden and set and finally hermetically sealing said space.

5. A method of fabricating heat insulating structures, comprising the steps of coating the inner surfaces of wall structure with an adhesive, permitting the coating to dry, assembling the walls in spaced relation to form heat insulation spaces therebetween, introducing a mass of dry, loose, and fibrous insulating material into said space, heating the structure to melt the coating and thereby causing the material to adhere to the walls and cooling the same.

6. A heat insulating structure consisting of spaced apart walls providing an insulation space therebetween, loose fibrous insulating material loosely disposed within and filling said space and adhesive means for causing the insulating material to adhere to the inner surfaces of said walls, and to cause the insulating material to be self-sustaining.

7. A heat insulating structure comprising spaced apart walls forming an intervening insulation space, a loose, flocculent and fibrous insulating material filling the said insulation space and discreet particles of adhesive dispersed throughout the said insulating material and serving to form numerous bonding centers for said material at numerous spaced points throughout the said space.

8. A method of fabricating thermally insulated structures comprising the steps of assembling walls in spaced relation to provide an intervening insulation space, introducing into said space a dry, loose, flocculent, fibrous insulating material having discreet particles of adhesive dispersed therethrough, heating the structure until the adhesive softens and then allowing the structure to cool, thereby forming numerous bonding centers for said flocculent material.

9. A heat insulating structure comprising spaced apart insulating walls forming an insulation space therebetween, loose fibrous insulating material disposed within said insulation space, and adhesive material cooperating with said material and imparting to the said structure the quality of having its insulating material self-sustaining, said adhesive material having become effective upon heating the structure, to impart the desired tackiness to the adhesive, and cooling thereof.

JOSEPH L. FINCK.